United States Patent [19]

Podwalny et al.

[11] Patent Number: 5,796,575
[45] Date of Patent: Aug. 18, 1998

[54] PORTABLE COMPUTER WITH HINGED COVER HAVING A WINDOW

[75] Inventors: Sergey Gary Podwalny; Michael D. Derocher; Scott N. Hickman, all of Corvallis; Jan Hippen, Portland, all of Oreg.

[73] Assignee: Hewlett-Packard Company, Palo Alto, Calif.

[21] Appl. No.: 994,035

[22] Filed: Dec. 21, 1992

[51] Int. Cl.$^6$ ............................................. G06F 1/16
[52] U.S. Cl. ..................... 361/681; 364/708.1; 361/683
[58] Field of Search ........................... 361/680, 681, 361/683; 364/708.1

[56] References Cited

U.S. PATENT DOCUMENTS

| | | | |
|---|---|---|---|
| D. 321,865 | 11/1991 | Derocher | D14/100 |
| 4,492,819 | 1/1985 | Rodgers et al. | 178/18 |
| 4,497,036 | 1/1985 | Dunn | 364/708 |
| 4,571,456 | 2/1986 | Paulsen et al. | 179/2 C |
| 4,616,106 | 10/1986 | Fowler et al. | 178/18 |
| 4,661,656 | 4/1987 | Rodgers et al. | 178/18 |
| 4,667,299 | 5/1987 | Dunn | 364/708 |
| 4,672,154 | 6/1987 | Rodgers et al. | 178/19 |
| 4,730,364 | 3/1988 | Tat-Kee | 16/337 |
| 4,742,478 | 5/1988 | Nigro, Jr. et al. | 364/708 |
| 4,781,422 | 11/1988 | Kimble | 312/72 |
| 4,825,395 | 4/1989 | Kinser, Jr. et al. | 364/708 |
| 4,832,419 | 5/1989 | Mitchell et al. | 312/7.2 |
| 4,917,465 | 4/1990 | Conner et al. | 350/335 |
| 4,918,632 | 4/1990 | York | 361/680 X |
| 4,926,365 | 5/1990 | Hsieh | 364/708 |
| 4,980,848 | 12/1990 | Griffin et al. | 364/708 |
| 5,001,659 | 3/1991 | Watabe | 364/708 |
| 5,002,368 | 3/1991 | Anglin | 350/334 |
| 5,021,922 | 6/1991 | Davis et al. | 361/380 |
| 5,036,313 | 7/1991 | Lin et al. | 340/700 |
| 5,041,965 | 8/1991 | Chen | 364/200 |
| 5,103,376 | 4/1992 | Blonder | 361/680 |
| 5,109,354 | 4/1992 | Yamashita et al. | 361/681 X |
| 5,109,573 | 5/1992 | Sherman | 16/341 |
| 5,113,360 | 5/1992 | Satou | 364/708 |
| 5,128,829 | 7/1992 | Loew | 361/683 |
| 5,138,565 | 8/1992 | Satou | 364/708 |
| 5,142,739 | 9/1992 | Lin | 16/326 |
| 5,200,913 | 4/1993 | Hawkins et al. | 361/681 |
| 5,237,488 | 8/1993 | Moser et al. | 361/729 |
| 5,247,285 | 9/1993 | Yakota et al. | 361/681 X |

FOREIGN PATENT DOCUMENTS

| | | |
|---|---|---|
| 0454120 | 10/1991 | European Pat. Off. . |
| 9205297 | 9/1992 | Germany . |
| 57-143626 | 9/1982 | Japan . |
| 4-237361 | 8/1992 | Japan . |
| WO91/05327 | 4/1991 | WIPO . |

OTHER PUBLICATIONS

User's Manual, T1600 Portable Personal Computer, Toshiba Corp. 2nd edit. Apr., 1987.

"Mobile Networked Computing, Safari NSX/20 Notebook Computer," AT&T Computer Systems, 4 page brochure, 1991.

*Primary Examiner*—Tan V. Mai
*Attorney, Agent, or Firm*—Curtis G. Rose

[57] ABSTRACT

A display cover is coupled to a portable computer by one of a variety of double-pivot hinges. Such arrangements permit the cover to be folded flush against the back of the computer, providing the screen protection benefits of a cover without the usually-attendant increase in computer "footprint." The preferred cover includes a window that permits a portion of the display to be viewed even when the cover is closed. By such an arrangement, alert or status messages can be conveyed to the user without requiring that the cover be opened. In some embodiments, the user can respond to visual or other alert messages, again without opening the cover.

13 Claims, 6 Drawing Sheets

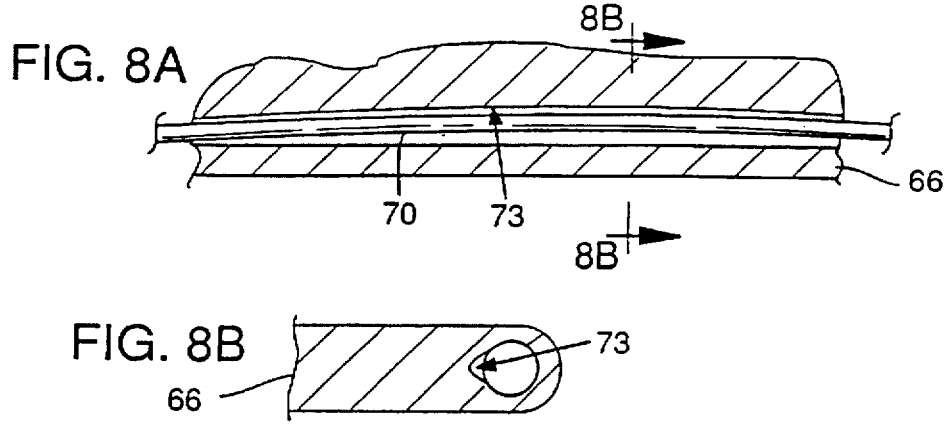
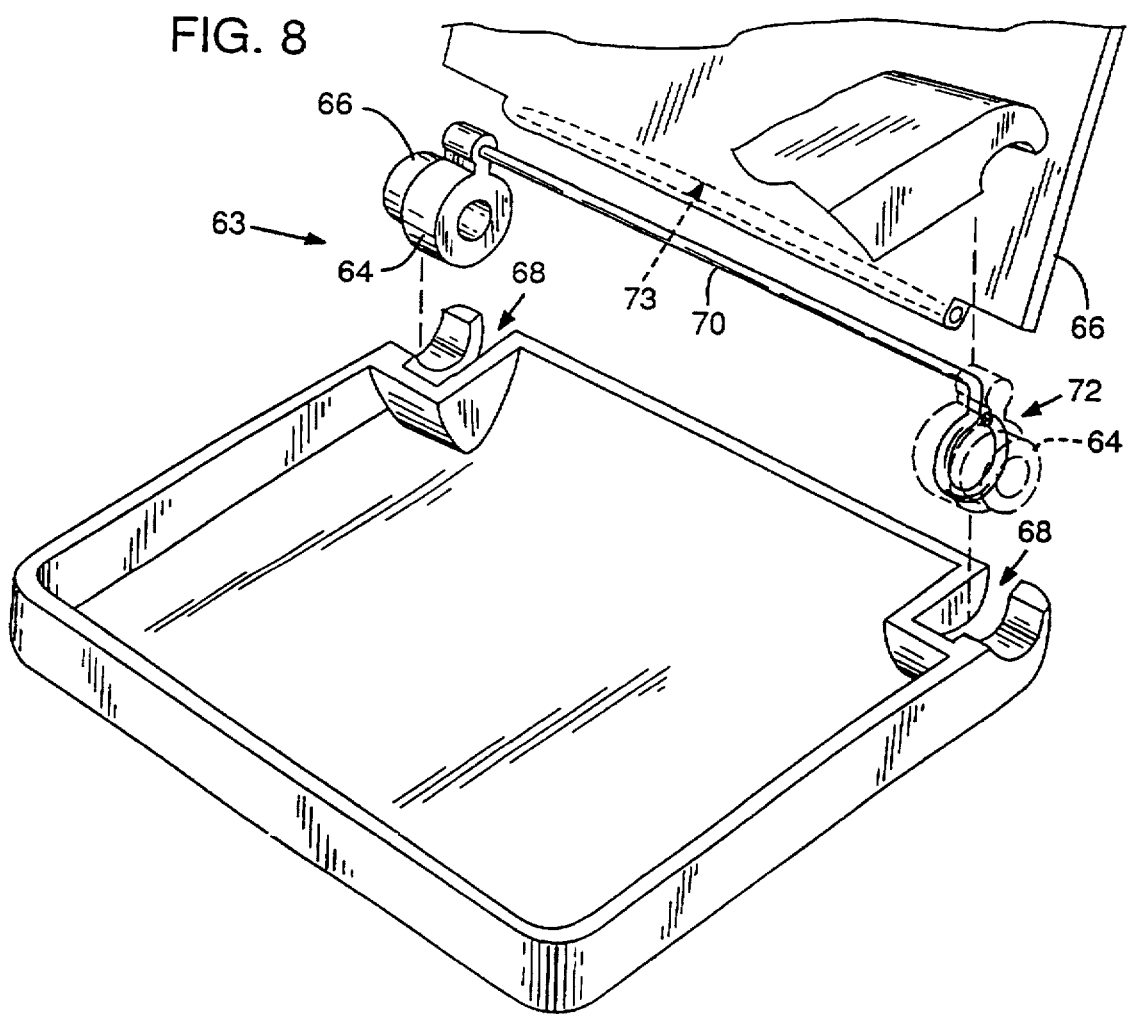

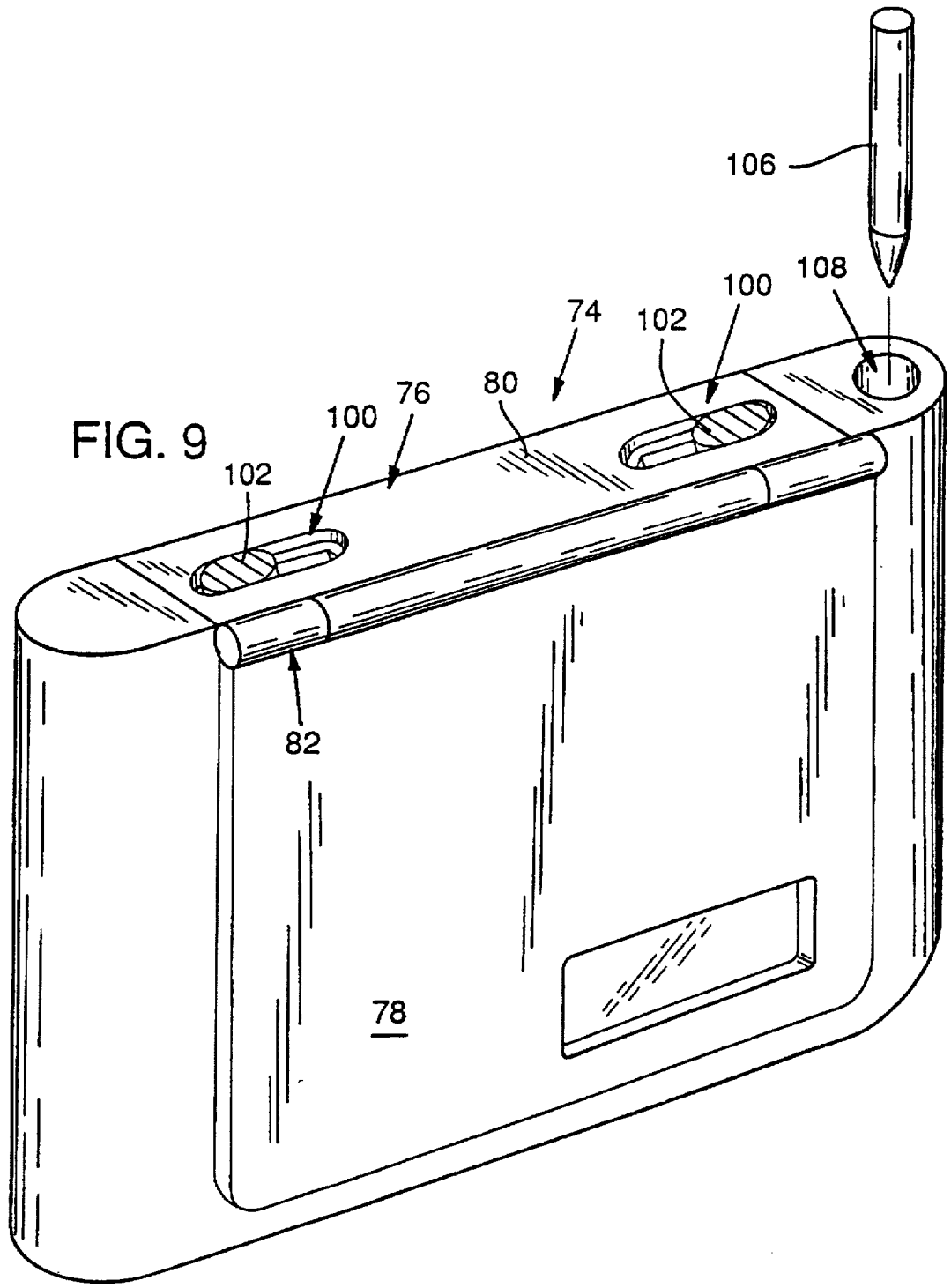

PORTABLE COMPUTER WITH HINGED COVER HAVING A WINDOW

FIELD OF THE INVENTION

The present invention relates to portable computers, and more particularly relates to methods and apparatuses facilitating user interaction with a portable computer without first opening a computer display cover.

BACKGROUND OF THE INVENTION

Portable computers are available in a wide variety of styles, including laptops, notebooks, palmtops, and write-on computers (the latter also being variously known as slate computers or pen computers, and being characterized by the absence of an alphanumeric keyboard). Some portable computers have an LCD or other flat-panel display that is protected from abuse by a hinged display cover.

Exemplary of these prior art display covers is the arrangement shown in Design Patent 321,865, wherein a hinged plastic plate overlies and protects the display of a write-on computer. Another common arrangement is that shown in allowed design patent application 07/652,743, wherein the display of a palmtop computer is protected by another component of the computer (such as the keyboard) folded adjacent thereto.

All of these arrangements suffer from a common failing: there is virtually no provision for user interaction with the computer when the cover is closed. (Some computers can "beep" at the user when the cover is closed.) As disclosed below, this is an unnecessary impairment of the computer's capabilities.

In accordance with one aspect of the present invention, a computer is provided with a display cover that permits visual—and in some cases tactile or stylus-based—interaction with the computer, even when the cover is closed. Such a computer may also be equipped with a touch-responsive input device that permits a user to acknowledge alerts from the computer, again without opening the display cover. In many embodiments, the computer is provided with an improved display cover hinge that facilitates operation.

The foregoing and additional features and advantages of the invention will be more readily apparent from the following detailed description thereof, which proceeds with reference to the accompanying drawings.

BRIEF DESCRIPTION OF THE DRAWINGS

FIG. 8 is an exploded view of a write-on computer incorporating a double-pivot hinge according to a fifth embodiment of the invention.

FIG. 8A is a detail showing a detent arrangement suitable for use with the FIG. 8 embodiment.

FIG. 8B is a further detail showing a detent arrangement suitable for use with the FIG. 8 embodiment.

FIG. 9 is a view of a write-on computer according to a sixth embodiment of the present invention.

FIG. 10 is a detail illustrating a flip-around double-pivot hinge used to couple the cover of the FIG. 9 computer to the housing.

DETAILED DESCRIPTION

Figure 1:
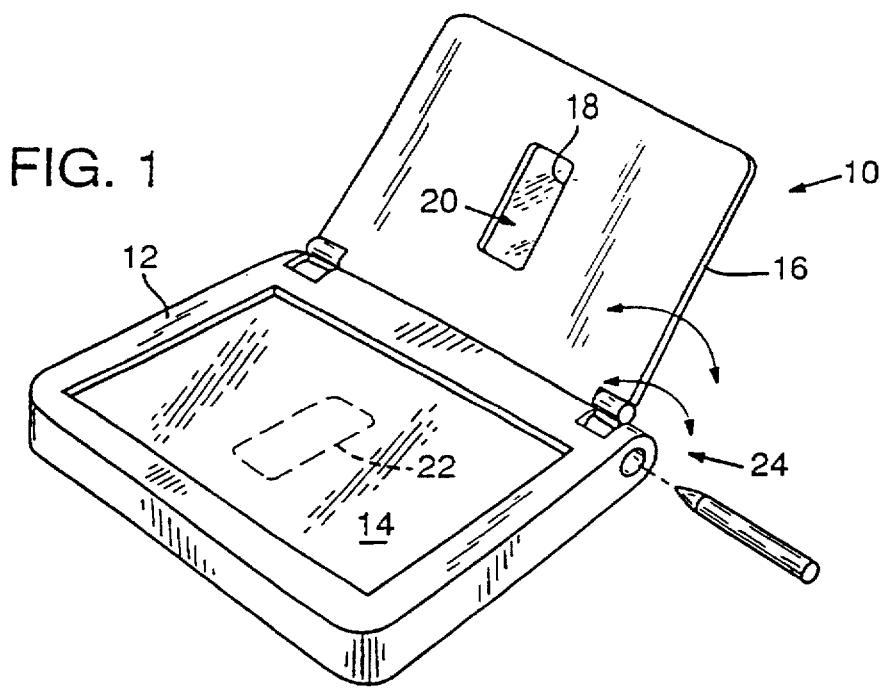
FIG. 1 is a view of a write-on computer according to a first embodiment of the present invention.
Figure 1A:
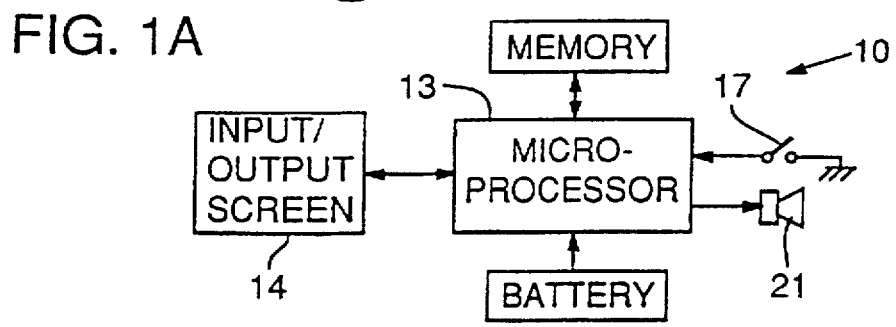
FIG. 1A is a simplified schematic block diagram of the computer of FIG. 1.

Referring to FIGS. 1 and 1A, a write-on computer 10 according to a first embodiment of the present invention includes a housing 12, a microprocessor 13, an input/output screen 14 mounted in the housing and coupled to the microprocessor, and a cover 16 movable between first and second positions. In the first position, the cover overlies and protects the input/output screen from damage. In the second position, the cover exposes the input/output screen for use.

In the preferred embodiment, the cover defines a window 18 which permits a portion of the input/output screen 14 to be viewed by the user even when the cover 16 overlies the screen. This window can include a transparent, rigid medium 20 serving to protect the screen from damage while permitting viewing therethrough. Alternatively, such a transparent medium can be omitted.

Window 18 finds particular application in conjunction with software applications that stay resident even when the computer is not in active use. Exemplary are software appointment calendars into which a user loads data relating to upcoming appointments. Many such programs include alarm features to alert the user to imminent appointments, even when the computer is otherwise idle. Another example of resident software applications are e-mail communications programs that alert users to incoming messages.

Previously, such programs have activated an audible tone alert device. In response, the user would open the computer to view the screen and determine the reason for the audible alert.

In accordance with this embodiment of the present invention, the software not only activates an audible alert device 21, but also displays an explanatory message on a portion 22 of the screen 14 visible through the window. By glancing at the computer, the user can determine the reason for the alert without going to the effort of opening the computer.

In addition to alert messages, the window can also be used to convey information relating to equipment status. In one such application, information pertaining to battery charge is displayed. In another, wherein the computer is used in conjunction with a desktop "docking"station and is connected to a network, the window can be used to display information relating to message traffic on the network. By such an arrangement, the user can avoid "undocking" the computer inadvertently in the middle of, for example, the downloading of e-mail or other network data to the computer.

If the message calls for a user response (i.e. acknowledgement), the user may be able to provide such a response without opening the cover. In embodiments in which the window does not include a transparent medium, the user can effect a response by using a stylus on the exposed region of the screen. For example, if the visible message reports an upcoming appointment or an incoming message, and the user wishes to acknowledge receipt in order to prevent the computer from issuing further alerts relating to the same matter, the user can simply draw a check-mark on the screen to effect acknowledgment.

This same capability can also be achieved in computers having transparent media-protected windows, provided the stylus operates on proximity rather than contact. Proximity-based styli are well known in the art and can, for example, include battery powered circuitry that selectively passes current through an inductor in the tip of the stylus. An array of sensing elements positioned below the LCD screen senses the resulting magnetic field and provides data indicating the stylus' position. (Related systems employing capacitive, rather than inductive, coupling are also known.) Kurta Corporation of Phoenix, Ariz. is a supplier of such equipment and is the owner of a number of patents on stylus-sensing technology suitable for use in the present invention, including numbers U.S. Pat. Nos. 4,672,154, 4,661,656, 4,616,106, and 4,492,819.

User alert acknowledgements can also be effected by via touch-responsive input devices, such as pushbuttons or capacitive switches. Desirably, such an input device is mounted where it can be accessed without opening the cover 16. In an illustrative embodiment, a pushbutton switch 17 having a button diameter of about 0.25 inches is mounted on the left side of the housing, approximately one inch down from the top. This switch is connected to a microprocessor input that is polled to solicit acknowledgement of alerts (whether audible or visual).

In related embodiments, other sensors can be used to accept alert acknowledgments. Some may find it gratifying to employ a vibration sensor, so that the computer can be struck to effect acknowledgement.

(It will be recognized that these alert acknowledgment features can be implemented even in write-on computers that do not employ covers to protect the input/output screen.)

The sizing and placement of an alert message on portion 22 of screen 16 is well within the capabilities of those of ordinary skill in the applications programming art. Application development tools associated with popular graphical user interface operating systems provide simple commands for the sizing and placement of message windows.

Many portable computers include battery-saving circuitry that blanks the screen when the computer is idle for a predetermined period, or when the cover is closed. In accordance with this aspect of the present invention, the screen is re-activated, at least temporarily, when an window message is to be provided to the user.

Figure 2:
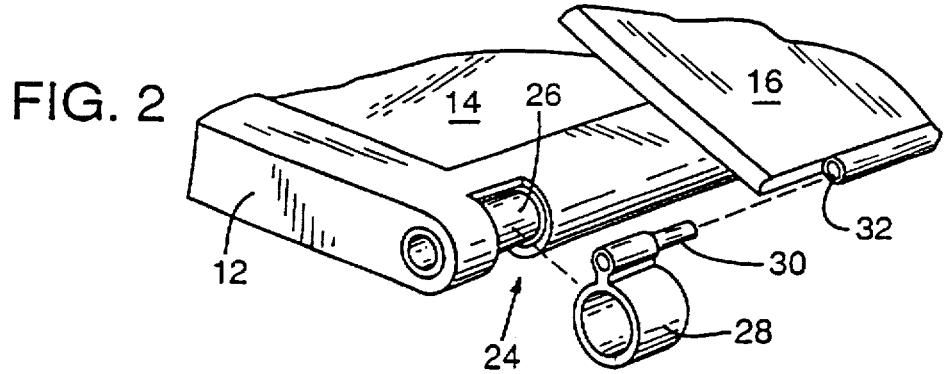
FIG. 2 is a detail showing a double-pivot hinge used to connect the cover to the housing in the write-on computer of FIG. 1.
Figure 3:
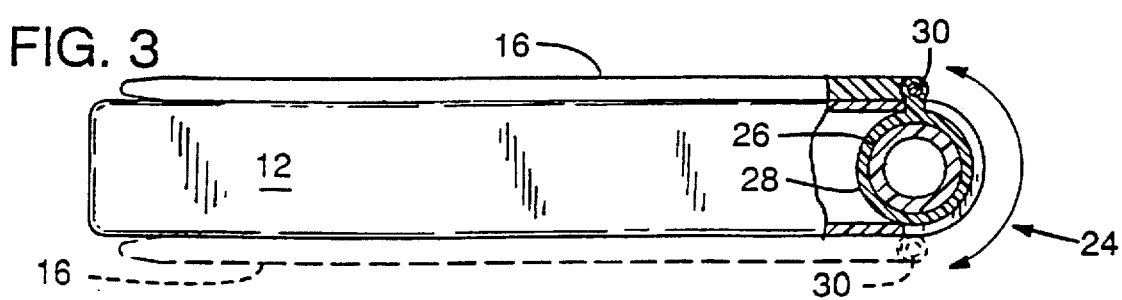
FIG. 3 is a sectional view of the write-on computer of FIG. 1, illustrating (in solid lines) the cover in a first position overlying the input/output screen and (in dashed lines) the cover position flush against the back of the housing.

Turning to mechanical details of construction, the cover 16 in FIG. 1 is coupled to the top of the housing 12 by a double-pivot hinge 24. As shown in FIGS. 2 and 3, this hinge includes a cylindrical ring bearing 26 formed in the case, on which an annular ring 28 rides. Ring 28 includes a finger 30 that engages a socket 32 in the cover 16. A pair of such ring/bearing assemblies are used-one at each side of the housing. (The rings can obviously be narrower than those shown in the Figures.) The bottom of the cover can be releasably attached to the housing by a magnetic closure. It will be recognized that the double-pivot hinge arrangement permits the cover to be folded flush against the back of the computer, providing the protection benefits of a display cover without the usually attendant increase in computer "footprint."

Figure 4:
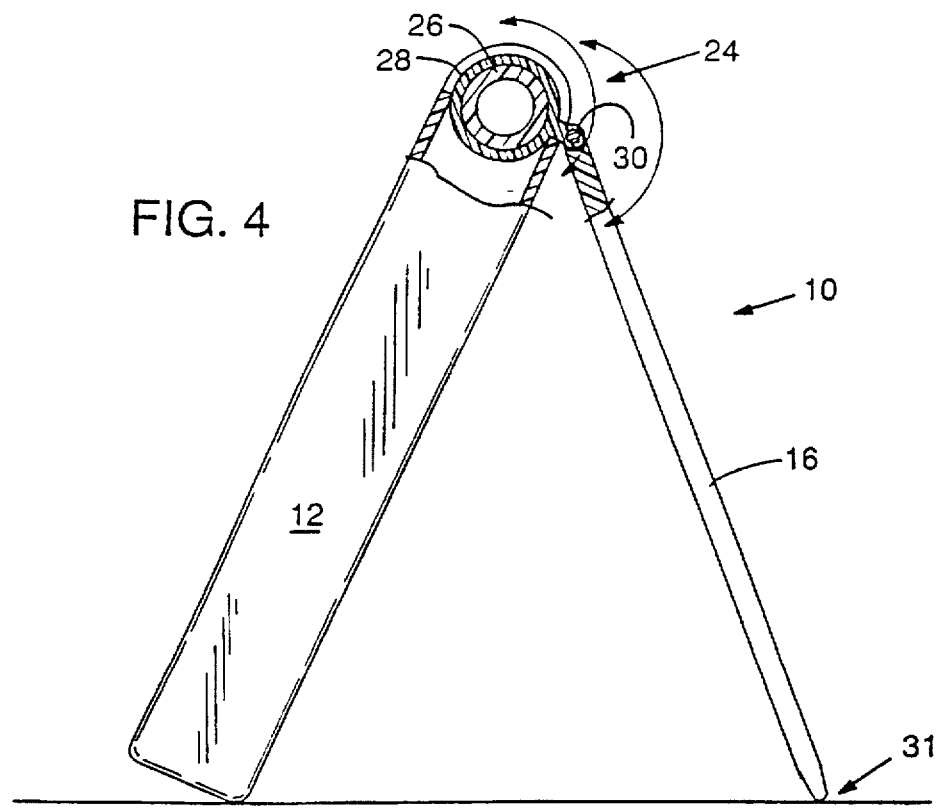
FIG. 4 is a side view, partially in section, showing the write-on computer of FIG. 1 arranged in an easel configuration.

Desirably, one of the pivots that makes up double-pivot hinge 24 includes a detent mechanism that secures the pivot against free rotation when in one or more predetermined angular positions. In the preferred embodiments, the detented position is provided at an end-of-travel position of the rings on the bearings. Such a detent permits the computer to be stably arranged in the easel-like fashion depicted in FIG. 4, with the propping up the housing. In this arrangement, the bottom edge 31 of the cover can be provided with a non-slick elastomer to increase stability. This easel position facilitates certain uses of the computer.

Figure 5:
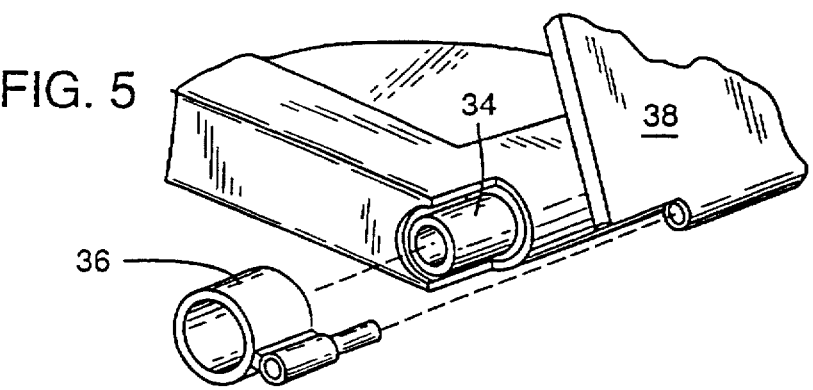
FIG. 5 is a detail of a write-on computer incorporating a double-pivot hinge according to a second embodiment of the present invention.

FIG. 5 shows a write-on computer incorporating a double-pivot hinge according to a third embodiment of the invention, wherein the ring bearing 34 extends to the edge of the housing. The ring 36 and display cover 38 correspond to elements 28 and 16 of FIG. 2.

Figure 6:
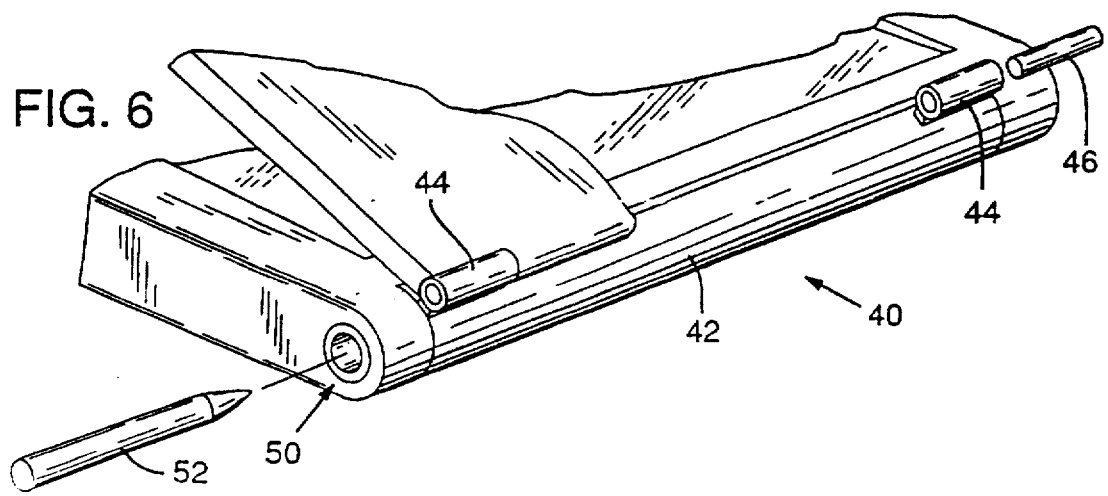
FIG. 6 shows a write-on computer incorporating a double-pivot hinge according to a third embodiment of the invention.

FIG. 6 shows a write-on computer 40 incorporating a double-pivot hinge according to a third embodiment of the invention. Whereas in FIGS. 1–5, the cover is held at its edges by pivots than can move independently, in FIG. 6 the pivots are mechanically connected, causing them to rotate in tandem. This is accomplished by use of an axle 42 rather than a pair of ring/bearing assemblies 28/26.

Axle 42 extends across the top of the computer 40 and is journalled or otherwise mounted to permit rotary motion. From the axle protrude features 44 that include pivot fingers 46. As in the FIG. 1 embodiment, the cover 48 is pivotally mounted on these fingers. As the axle rotates, the fingers 46 move in tandem. This tandem motion avoids "racking," a phenomenon caused by independent motion of two spaced hinges, which can result in binding of the hinge.

Axle 42 desirably includes an axial bore 50 in which a stylus 52 can be stored.

Figure 7:
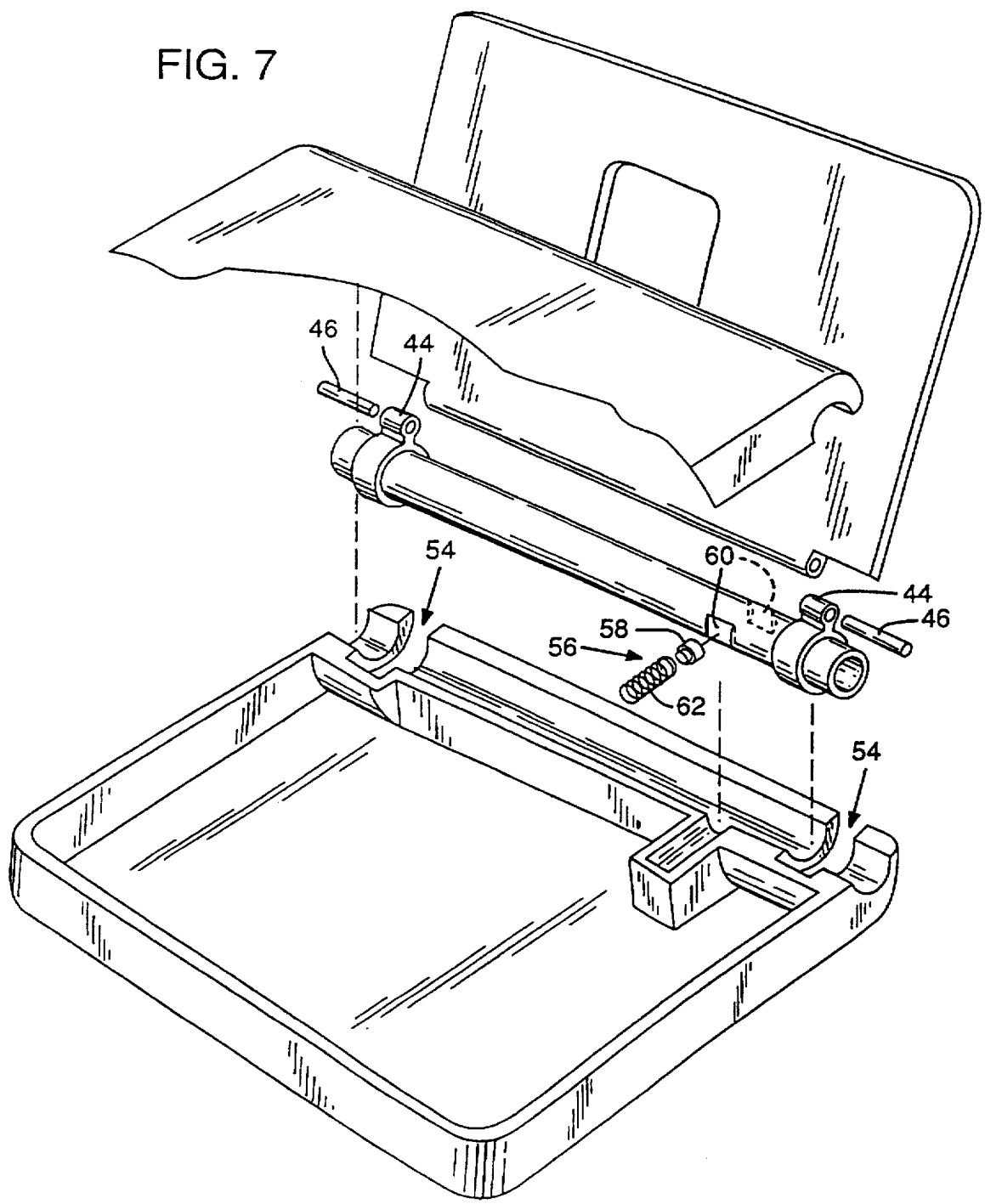
FIG. 7 is an exploded view of a write-on computer incorporating a double-pivot hinge according to a fourth embodiment of the invention.

In the FIG. 6 embodiment, the axle is external and forms part of the external surface of the computer. In a related embodiment, shown in FIG. 7, the axle is disposed within the computer housing. In this embodiment, the housing is provided with slots 54 through which features 44 extend to couple to the cover. FIG. 7 also shows a representative detent mechanism 56 that can be used to secure the axle against free rotation. The illustrated detent mechanism includes a nib 58 that is urged against a flat face 60 on the axle by a spring 62.

FIG. 8 shows the presently preferred double-pivot hinge 63. In this arrangement a pair of plastic rings 64 (having shoulders 66 journalled in cradles 68) are physically interconnected with a rigid steel wire 70 to avoid racking. The cover 66 is pivotally mounted on the wire.

The rigid wire 70 can be connected to the rings 64 by various attachment means. The preferred attachments, however, are effected by forming the ends of the wire in the configuration 72 shown, and insert molding the plastic rings 64 around the formed wire. This arrangement provides superior strength over other attachment techniques.

Attachment of the cover 66 to the wire 70 can also be accomplished by various means. The preferred technique is to fabricate the cover in two pieces: a base piece, and a top piece which cooperate to define the bore through which the wire passes. These pieces are then ultrasonically welded around the wire.

In this embodiment, the cover 66 has a thickness of 3.8 mm, and the wire has a thickness of 1.5 mm. At the top edge of the cover, where the top and bottom pieces are welded to contain the wire, there is a ridge having a thickness of 4.5 mm. The housing of the computer has a thickness of 26 mm. The distance between the two pivot axes (i.e. the center-to-center radial distance between the rings 64 and the wire 70) is great enough to provide a 0.5 mm spacing between the top of the cover and the housing when the cover is in its closed position. This gap assures the cover won't bind regardless of manufacturing tolerances.

The illustrated housing and cover are made of polycarbonate/ABS plastic, with the rings 64 and the associated cradles 68 being made of a self-lubricating material, such as teflon- or silicone-impregnated plastic.

It is possible to effect a detent in the pivotal mounting of the cover 66 on the wire 70 by slightly bending or kinking the wire, and providing a small slot or indentation 73 in the side of the bore within the cover in which this bend or kink can fit, as shown in FIGS. 8A and 8B. When the cover is rotated about the wire to a predetermined position, the bent/kinked wire—which is normally confined to the linear bore—can expand into the slot or indentation, resisting further rotation absent increased torque.

It is possible to effect a detent in the pivotal mounting of the wire to the housing by the same arrangement depicted in FIG. 7, viz. to use a spring detent radially directed against the rings 64. Alternatively, an axially directed detent, such as against the sides of the shoulders 66, can also be used. If desired, both of the pivots that comprise the double-pivot hinge can have their own detent mechanism.

FIGS. 9-13 show a write-on computer 74 using a flip-around double-pivot hinge 76. In this arrangement, a cover 78 is connected to an intermediate member 80 by a first pivot 82. The intermediate member, in turn, is pivotally to the computer housing 84 by a second pivot 86.

The first pivot 82 includes a socket in the cover which cooperates with a finger 90 extending from the intermediate member to provide pivotal motion of the cover around the edge of the intermediate member.

Figure 11:
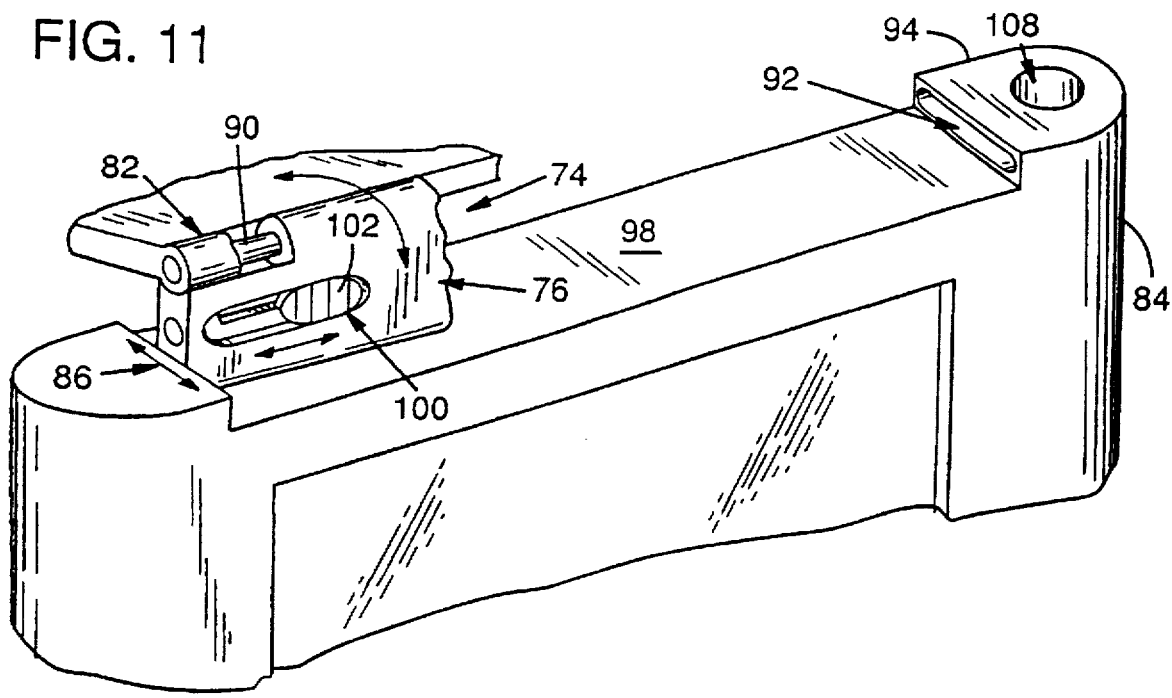
FIG. 11 further details operation of the flip-around double-pivot hinge used with the computer of FIG. 9.
Figure 12:
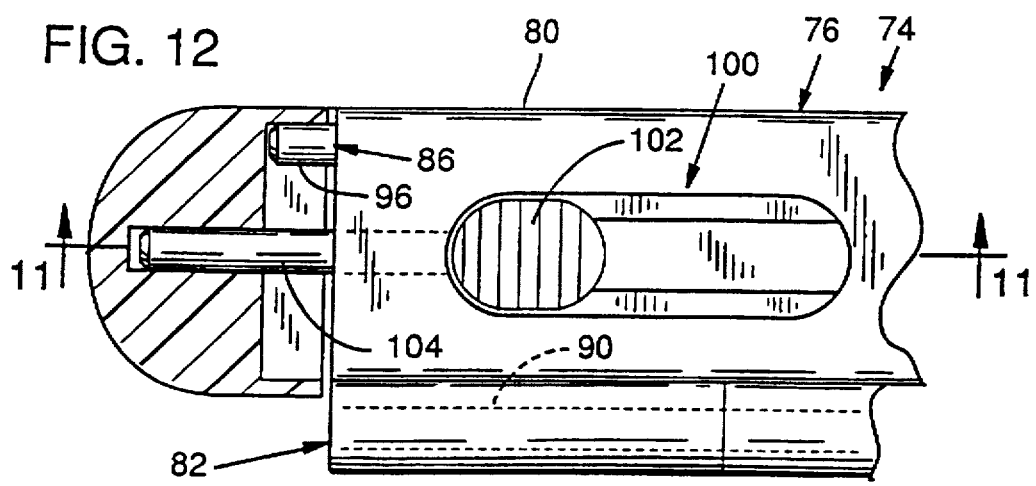
FIG. 12 is a top plan view, partially in section, illustrating the double-pivot hinge of FIG. 11.
Figure 13:
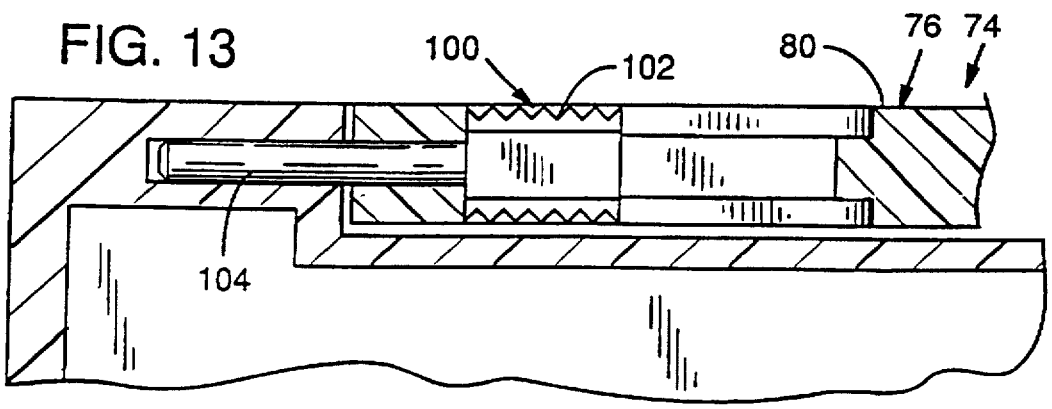
FIG. 13 is a sectional view illustrating the double-pivot hinge of FIG. 11.

The second pivot 86 includes a slot 92 in a boss 94 portion of the housing 84, which cooperates with a finger 96 extending from the intermediate member 80. As best shown in FIG. 11, slot 92 permits the axis of the second pivot 86 to be slid back and forth along the top face 98 of the computer. This arrangement permits linear motion, as well as pivotal motion, of the intermediate member relative to the top face of the computer.

Intermediate member 80 further includes a sliding latch 100 comprised of a slidably mounted thumb grip 102 having a locking pin 104 extending therefrom. The thumb grip 102 is two-sided, permitting operation of the latch 100 regardless of which face of the intermediate member faces the computer housing, and which is exposed for use.

In operation, the intermediate member 80 can be flipped (about the second pivot 86) so that either of its two faces abuts the top face 98 of the computer. The intermediate member can then be secured in this position by urging the thumb grips toward the outer edges of the computer, engaging the locking pins 104 in the slots 92. Depending on which face of the intermediate member is adjacent the computer, the cover pivot 82 will be positioned adjacent either the front or back of the computer. In the former position, the cover can be folded down to overlie the display. In the latter position, the cover can be folded flush against the back of the computer, out of the user's way.

Like the computer shown in FIG. 1, the computer of FIG. 9 includes provision for storing a stylus 106 in a bore 108 defined in the housing. However, the bore in FIG. 9 is disposed perpendicularly to the axis of the cover hinge, rather than parallel thereto.

From the foregoing, it will be recognized that computers according to the present invention provide a number of important advantages. Computers including display cover windows according to the present invention permit communication to, and in some cases from, the user without requiring the user to first open the display cover. Computers including alert acknowledgement provisions further facilitate user interaction, again without requiring that the display cover first be opened. Write-on computers incorporating double-pivot hinge covers according to the present invention provide the protection benefits of a display cover without the usually-attendant increase in computer "footprint." Hinges incorporating plastic that is injection molded onto steel wire can be kept within much tighter manufacturing tolerances than those employing exclusively plastic or exclusively steel parts.

Having described and illustrated the principles of our invention with reference to preferred embodiments, it should be apparent that the invention can be modified in arrangement and detail without departing from such principles. For example, while the invention has been illustrated with reference to a cover that is secured to the top of a computer housing, it will be recognized that the cover can alternatively be secured to a side of the housing instead. Such an arrangement advantageously serves a shading function in situations where light incident from the side of the display might otherwise create glare. Other adaptations of the cover of the present invention to shade the display will be apparent to those of ordinary skill in the art.

Similarly, while the invention has been illustrated with reference to a cover that can lie flat against the front or back of a computer by virtue of a double-pivot hinge, it will be recognized that similar benefits can be achieved by alternative arrangements. In one such arrangement, the side edges of the cover are adapted to slidingly engage a pair of corresponding tracks formed in the front and back of the computer. By this arrangement, the cover can be slid from the front, exposing the display, and thereafter inserted into the tracks on the back, securing the cover out of the way.

In still further embodiments of the invention, it will be recognized that the window and/or alert acknowledgement features can be employed in a computer without a double-pivot hinge.

In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A computer comprising:

a housing;

an input/output screen mounted in the housing; and a cover movable between first and second positions and secured in each position to the housing, in the first position the cover being arranged to overlie and protect the input/output screen, in the second position the cover exposing the input/output screen for use, the cover defining a window permitting a portion of the input/output screen to be viewed even when the cover is in the first position.

2. The computer of claim 1 which further includes a stylus for providing input to the input/output screen when the cover is in the first position.

3. The computer of claim 1 which further includes a touch-responsive input element coupled to a microprocessor and accessible without opening the cover, said element permitting the user to conveniently acknowledge alerts from the computer without opening the cover.

4. A computer comprising:

a housing;

30 a display mounted in the housing;

a cover movable to protect the display;

a first hinged joint between the cover and an intermediate member; and a second hinged joint between the intermediate member and the housing, the second hinged joint having a pivot axis movable with respect to the housing, wherein the cover defines a window permitting a portion of the display to be viewed even when the cover overlies the display.

5. The computer of claim 4 in which the computer is a write-on computer having an input/output screen mounted in the housing and having a stylus associated therewith.

6. The computer of claim 4 in which the cover has a thickness less than 5 mm.

7. The computer of claim 4 in which at least one of said hinged joints includes a detent adapted to hold said joint in a fixed position.

8. A computer comprising:

a housing;

an input/output screen mounted in the housing;

a stylus for use with the input/output screen;

a cover movable to protect the input/output screen, said cover defining a window permitting a portion of the display to be viewed even when the cover overlies the display; and a double pivot joint coupling the cover to the housing.

9. The computer of claim 8 in which the double-pivot joint includes a rigid wire extending the width of the cover, and about which the cover pivots, the double-pivot hinge further including a pair of pivoting elements, one of said elements being coupled to each end of the rigid wire and serving to hingedly couple the rigid wire to the housing.

10. The computer of claim 9 in which the pivoting elements are insert molded about the ends of the rigid wire.

11. The computer of claim 8 in which one pivot of said double-pivot joint includes a detent adapted to hold said pivot in a fixed position.

12. A method of operating a computer, the computer including a housing with an input/output screen mounted in a front thereof a cover, and a back, the method including the steps of:

positioning the cover in a first position overlying the input/output screen when the input/output screen is to be protected;

moving the cover to a second position lying flush against the back of the housing when the input/output screen is to be exposed for use; and viewing a portion of the input/output screen through an opening in the cover when the cover is positioned to overlie the input/output screen, wherein the cover is available to provide protection to the screen, but does not increase the footprint of the computer when open for use.

13. The method of claim 12 which further includes deterring rotational movement between the cover and the housing so as to facilitate positioning the input/output screen in a near vertical, easel position.

* * * * *

UNITED STATES PATENT AND TRADEMARK OFFICE
CERTIFICATE OF CORRECTION

PATENT NO. : 5,796,575
DATED : August 18, 1998
INVENTOR(S) : Podwalny et al.

It is certified that error appears in the above-identified patent and that said Letters Patent is hereby corrected as shown below:

Column 7,
Line 17, before "a display" delete "30"

Column 8,
Line 20, after "thereof" insert -- , --

Signed and Sealed this

Twenty-first Day of October, 2003

JAMES E. ROGAN
*Director of the United States Patent and Trademark Office*